(12) United States Patent
Lim

(10) Patent No.: US 7,525,079 B2
(45) Date of Patent: Apr. 28, 2009

(54) CMOS IMAGE SENSOR CIRCUIT AND METHOD OF SUPPLYING INITIAL CHARGE THEREOF

(75) Inventor: Su-hun Lim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/589,722

(22) Filed: Oct. 31, 2006

(65) Prior Publication Data

US 2007/0108370 A1 May 17, 2007

(30) Foreign Application Priority Data

Nov. 17, 2005 (KR) .................. 10-2005-0110119

(51) Int. Cl.
*H01L 27/00* (2006.01)
*H04N 3/14* (2006.01)
*H04N 5/335* (2006.01)

(52) U.S. Cl. .................. 250/208.1; 348/294; 348/311

(58) Field of Classification Search .............. 250/208.1, 250/214 R, 214.1; 348/294–324
See application file for complete search history.

(56) References Cited

U.S. PATENT DOCUMENTS

| 6,344,877 B1 * | 2/2002 | Gowda et al. ............... 348/245 |
|---|---|---|
| 6,801,253 B1 * | 10/2004 | Yonemoto et al. ............ 348/241 |
| 6,919,551 B2 * | 7/2005 | Barna et al. .............. 250/214 R |
| 7,057,655 B1 * | 6/2006 | Masuyama ................. 348/302 |
| 2005/0104981 A1 * | 5/2005 | Findlater et al. ............ 348/241 |

FOREIGN PATENT DOCUMENTS

| JP | 11-266400 | 9/1999 |
|---|---|---|
| JP | 2000-152084 | 5/2000 |
| JP | 2003-060990 | 2/2003 |
| WO | WO 03/054922 A2 | 7/2003 |

\* cited by examiner

*Primary Examiner*—Georgia Y Epps
*Assistant Examiner*—Jennifer Bennett
(74) *Attorney, Agent, or Firm*—Harness, Dickey & Pierce, P.L.C.

(57) ABSTRACT

Provided are a CIS circuit that does not increase an initial voltage charge time allocated by a CDS even if a pixel size is reduced and a method of providing an initial charge to the CIS circuit. The CIS circuit may include an APS block, a current source block and a charge supply block. The APS block may output APS signals from APS output terminals in response to sensed image transfer signals, pixel select signals and pixel reset signals. The current source block may control currents flowing from the APS output terminals to a power supply in response to a bias voltage. The charge supply block may provide a quantity of charges to the APS output terminals in response to a representative reset signal and a pre-resent signal.

16 Claims, 4 Drawing Sheets

CMOS IMAGE SENSOR CIRCUIT AND METHOD OF SUPPLYING INITIAL CHARGE THEREOF

PRIORITY STATEMENT

This application claims the benefit of priority under 35 U.S.C. § 119 to Korean Patent Application No. 10-2005-0110119, filed on Nov. 17, 2005, in the Korean Intellectual Property Office, the disclosure of which is incorporated herein, in its entirety, by reference.

BACKGROUND OF THE INVENTION

1. Field of the Invention

Example embodiments relate to a CMOS image sensor (CIS). More particularly, example embodiments relate to a high-resolution CIS circuit performing correlated double sampling.

2. Description of the Related Art

A conventional CMOS image sensor (CIS) fabricated by a conventional CMOS process may be operated with a voltage lower than the voltage required for operating a conventional charge-couple device (CCD) and thus, a conventional CMOS image sensor (CIS) generally has power consumption less than the conventional CCD. Furthermore, the CIS may be formed using a standardized CMOS fabrication process and thus, pixels of the CIS may be highly integrated.

FIG. 1 is a block diagram of a conventional CIS circuit 100. Referring to FIG. 1, the conventional CIS circuit 100 may include a plurality of pixels 110 through 160 and a plurality of bias circuits 170 and 180. Each of the pixels may be operated by a sensed image transfer signal TGi, a pixel select signal SELi and a pixel reset signal RGi, wherein i is an integer corresponding to one of 1 through N and N is a number of pixels in each pixel array.

The conventional CIS circuit 100 may have M pixel arrays each including N pixels that may be arranged in a column, wherein M is an integer. A first pixel array may output a first signal APS_OUT1 through output terminals of N pixels 110, 120 and 130. The voltage of the first signal APS_OUT1 may be controlled by the bias circuit 170 associated with the N pixels 110, 120 and 130. An $M^{th}$ pixel array may output an $M^{th}$ signal APS_OUTM through an output terminal of another pixel array, which may include N pixels 140, 150 and 160. The voltage of the $M^{th}$ signal APS_OUTM may be controlled by the bias circuit 180 associated with the N pixels 140, 150 and 160. The M signals APS_OUT1 through APS_OUTM may have information about video signals output from the pixels included in the pixel arrays.

Each of the pixels may include an active pixel sensor (APS) that may sense a video signal and output an analog voltage signal corresponding to the sensed video signal. Thus, a conventional CIS circuit using an APS generally requires an analog-digital converter (ADC) for converting the analog signal into a digital signal. Conventional CIS circuits may use a single ADC system or a column ADC system.

A single ADC system may convert APS analog output signals of all columns into digital signals within a fixed period of time using a single ADC. A single ADC system may have a relatively small chip area because only a single ADC is used; however, the single ADC system generally requires a relatively large amount of power to perform a high-speed operation to convert all of the signals within the fixed period of time.

A column ADC system may use a plurality ADCs, each having a relatively simple structure and being associated with a column of pixels in the column ADC system. Accordingly, a column ADC system generally requires a relatively large chip area; however, the power consumption of the column ADC system is generally less than the power consumption of a comparable single ADC system. A column ADC system may perform correlated double sampling (CDS) for APS analog output signals of columns and may process sensed video signals using a voltage obtained from the CDS.

FIG. 2 is an example timing diagram of a CDS operation performed by a conventional CIS circuit. Referring to FIG. 2, if the pixel select signal SELi for selecting an $i^{th}$ pixel of a pixel array is enabled (e.g., a high level), the pixel reset signal RGi may be disabled (e.g., transitioned to a low level) so that a power supply voltage VDDA may be provided to the $i^{th}$ pixel. While the pixel select signal SELi is at a high level and the pixel reset signal RGi is at a low level, a sampling signal SAM may be enabled a first and second time. The initial voltage of the pixel corresponding to the pixel select signal SELi may be sensed in response to a first enabling pulse of the sampling signal SAM and a voltage varied according to the initial voltage and a voltage corresponding to an image sensed signal may be sensed in response to the second enabling pulse of the sampling signal SAM. The voltage corresponding to an image sensed signal may be output as an $i^{th}$ signal APS_OUTi. Accordingly, the sensed image transfer signal TGi may be enabled at a time between the first enabling pulse and the second enabling pulse of the sampling signal SAM.

A high-resolution CIS may be needed to satisfy demands for high-resolution images. To provide a high-resolution CIS, a large number of pixels sensing video signals may be desired and/or required. However, a high-resolution CIS is generally operated at the same frame rate as a low-resolution CIS. Accordingly, the number of pixels processed within a predetermined period of time is generally greater in a high-resolution CIS than in a low-resolution CIS. Accordingly, the time allocated for processing a single pixel signal is generally shorter in a high-resolution CIS than in a low-resolution CIS.

An APS analog output signal APS_OUT may have a low voltage at the instant of time when a conventional CDS operation starts and may be charged with a voltage corresponding to a reset level of a corresponding pixel during a reset sampling period. FIG. 2 illustrates APS_OUTi, which is the charge time allocated to set an initial voltage for a pixel, which may be necessary prior to sensing a voltage corresponding to an image sensed signal from the pixel.

Referring to FIG. 1, to allow the output signal APS_OUT1 of the pixel 110 to have a desired and/or predetermined initial voltage, a desired and/or predetermined quantity of current flows from the source of the power supply voltage VDDA. The size of a MOS transistor indicated by a dotted-line circle may determine the quantity of current supplied from the source of the power supply voltage VDDA. For example, as the size of the MOS transistor increases, a speed of setting the initial voltage generally increases.

However, the size of the MOS transistor is generally reduced to obtain a higher resolution. As the size of the MOS transistor decreases, a time required for supplying charges to a capacitor Cp of a signal line generally increases. Consequently, the amount a pixel size may be reduced in order to obtain a higher resolution may be limited.

SUMMARY

Example embodiments provide a CIS circuit that does not increase an initial voltage charge time allocated by a CDS even if a pixel size of the CIS circuit is reduced.

Example embodiments provide a method of providing an initial charge of a CIS circuit that does not increase an initial voltage charge time allocated by a CDS even if a pixel size of the CIS circuit is reduced.

An example embodiment provides a CIS circuit. The CIS circuit may include an APS block, a current source block and a charge supply block. The APS block may output APS signals from M (M is an integer) APS output terminals in response to N (N is an integer) sensed image transfer signals, N pixel select signals and N pixel reset signals. The current source block may control currents flowing from the APS output terminals to a power supply in response to a bias voltage. The charge supply block may provide a desired and/or predetermined quantity of charges to the APS output terminals in response to a representative reset signal enabled whenever the N reset signal is enabled and a pre-reset signal enabled for a period of time when the N pixel select signals and the representative reset signal are enabled.

An example embodiment provides a method of providing initial charges to M (M is an integer) APS output terminals of a CIS circuit including an APS block outputting APS signals from the M APS output terminals in response to N (N is an integer) sensed image transfer signals, N pixel select signals and N pixel reset signals, and a current source block controlling currents flowing from the APS output terminals to a power supply in response to a bias voltage. The method may include providing the initial charges to the APS output terminals in response to a representative reset signal enabled whenever the N reset signal are enabled and a pre-reset signal enabled for a period of time when the N pixel select signals and the representative reset signal are enabled.

An example embodiment provides a CIS circuit. The CIS circuit may include an active pixel sensor (APS) block including a plurality of pixels and outputting APS signals from a plurality of APS output terminals in response to a plurality of sensed image transfer signals, a plurality of pixel select signals and a plurality of pixel reset signals associated with the plurality of pixels; a current source block controlling currents flowing from the plurality of APS output terminals to a power supply in response to a bias voltage; and a charge supply block providing a quantity of charges to the plurality of APS output terminals in response to a representative reset signal and a pre-reset signal.

An example embodiment provides a method of providing initial charges to at least one APS output terminal of a CIS circuit. The method may include receiving a representative reset signal and a pre-reset signal; providing the initial charges to the at least one APS output terminal in response to the representative reset signal and the pre-reset signal; and adding the initial charges to charges provided to the at least APS output terminal from at least one pixel of the CIS circuit.

BRIEF DESCRIPTION OF THE DRAWINGS

The above and other features and advantages of example embodiments will become more apparent by the following detailed description of example embodiments considered in conjunction with the attached drawings in which.

DETAILED DESCRIPTION OF EXAMPLE EMBODIMENTS

Figure 1:
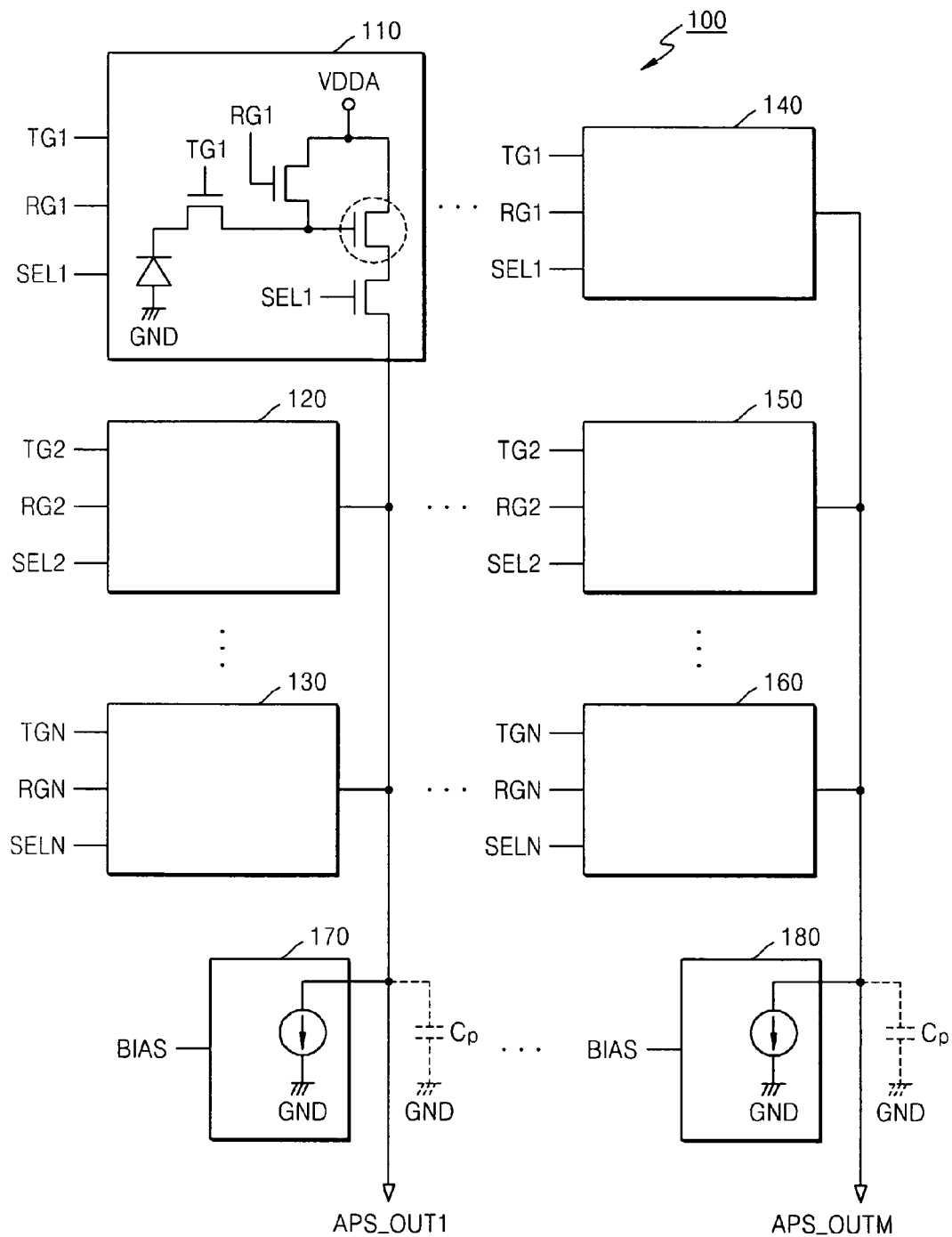
FIG. 1 is a block diagram of a conventional CIS circuit.
Figure 2:
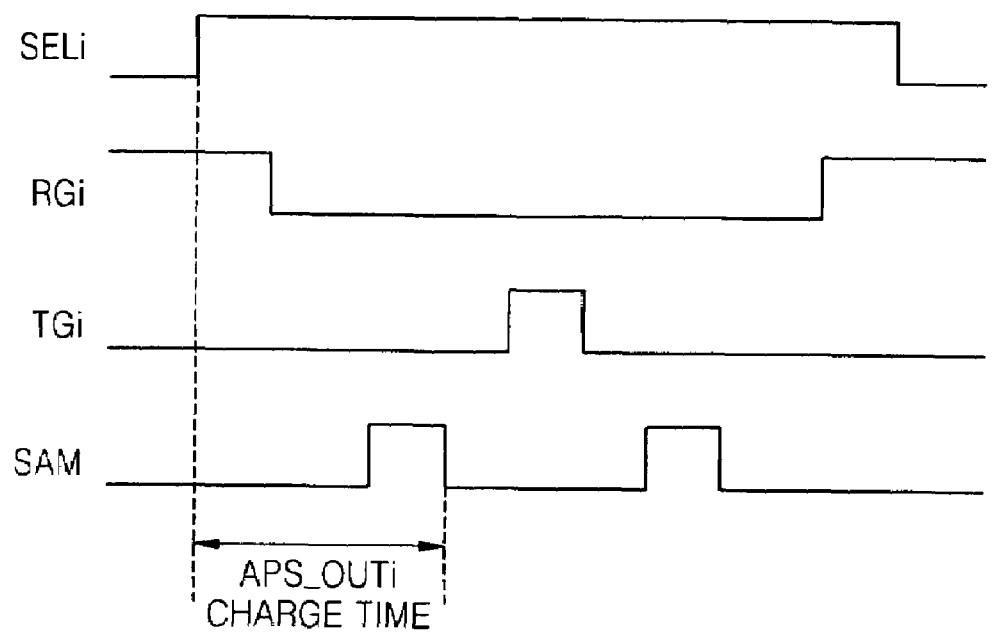
FIG. 2 is an example timing diagram of a conventional CDS operation.

Example embodiments are described more fully hereinafter with reference to the accompanying drawings. Embodiments may, however, be in many different forms and should not be construed as limited to the example embodiments set forth herein. Rather, these example embodiments are provided so that this disclosure will be thorough and complete, and will fully convey the scope to those skilled in the art. In the drawings, the size and relative sizes of components may be exaggerated for clarity. Throughout the drawings, like reference numerals refer to like components.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
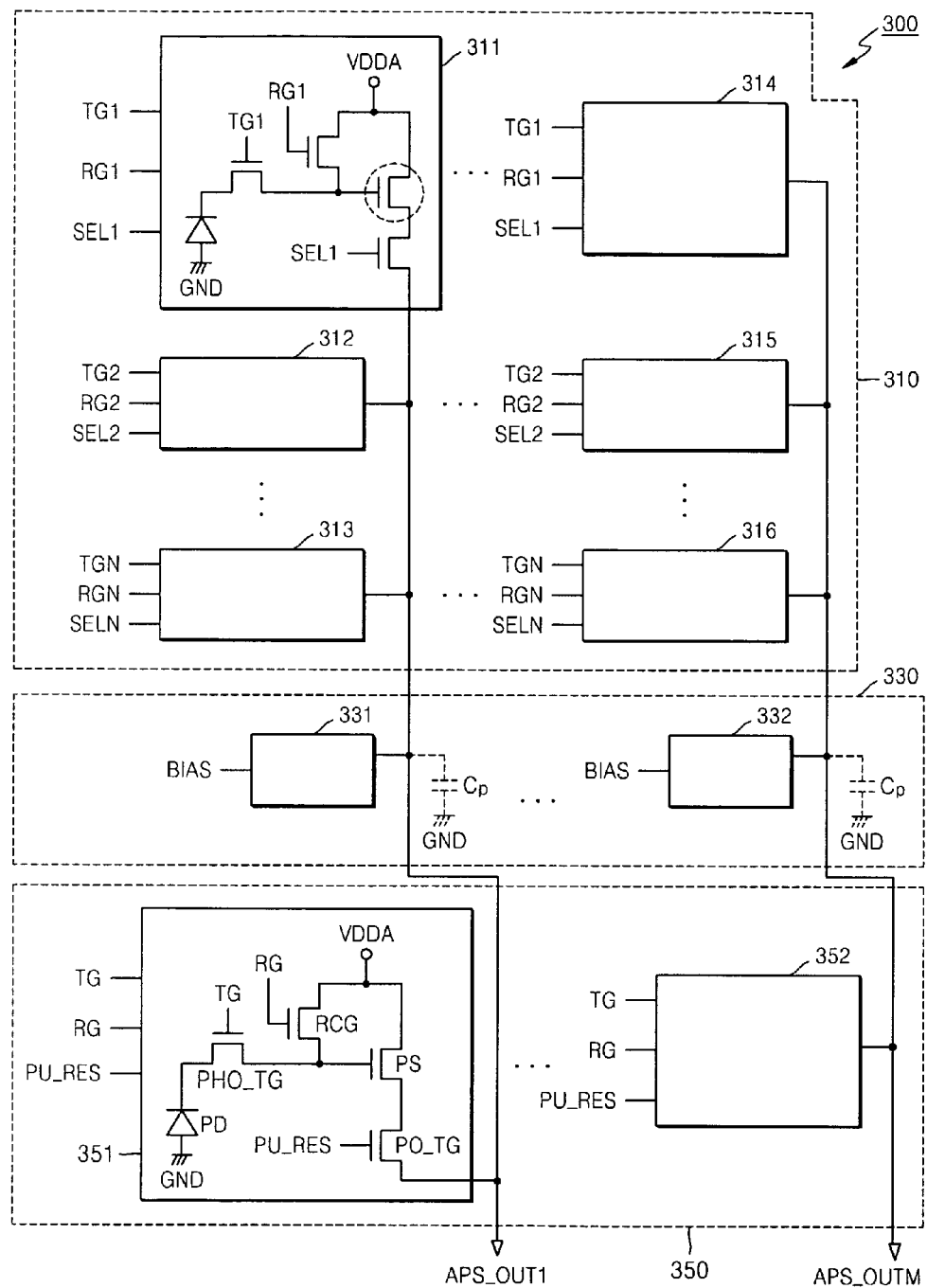
FIG. 3 is a block diagram of an example embodiment of a CIS circuit.

FIG. 3 is a block diagram of an example embodiment of a CIS circuit 300. Referring to FIG. 3, the CIS circuit 300 may include an APS block 310, a current source block 330 and a charge supply block 350.

The APS block 310 may output M APS signals APS_OUT1 through APS_OUTM, wherein M is an integer corresponding to a number of pixel arrays, which may include pixels arranged in a column. The APS signals APS_OUT1 through APS_OUTM may be output from M APS output terminals in response to N sensed image transfer signals TG1 through TGN, N pixel select signals SEL1 through SELN and N pixel reset signals RG1 through RGN, wherein N is an integer corresponding to a number of pixels in each pixel array. The sensed image transfer signals TG1 through TGN may instruct the transfer of video signals sensed by photodiodes included in pixels corresponding to the sensed image transfer signals TG1 through TGN. The pixel select signals SEL1 through SELN allow selected pixels to instruct an associated APS output terminal to output an APS signal. The pixel reset signals RG1 through RGN may reset initial voltages of the APS signals output from the pixels to a desired and/or predetermined voltage.

The APS block 310 may include M pixel arrays each having N pixels. A first pixel array may output a first APS signal APS_OUT1, a second pixel array may output a second APS signal APS_OUT2 and an $M^{th}$ pixel array may output an $M^{th}$ APS signal APS_OUTM.

The first pixel array outputting the first APS signal APS_OUT1 may have N pixels including first, second and $N^{th}$ pixels 311, 312 and 313, for example. The first pixel 311 may be operated in response to a first sensed image transfer signal TG1, a first pixel select signal SEL1 and a first pixel reset signal RG1. The second pixel 312 may be operated in response to a second sensed image transfer signal TG2, a second pixel select signal SEL2 and a second pixel reset signal RG2. The $N^{th}$ pixel 313 may be operated in response to an $N^{th}$ sensed image transfer signal TGN, an $N^{th}$ pixel select signal SELN and an $N^{th}$ pixel reset signal RGN. The pixels are substantially similar and/or identical to pixels of conventional CIS circuits and thus, further explanation of the pixels is omitted herein for the sake of brevity.

The current source block 330 may control currents flowing from the APS output terminals APS_OUT1 through APS_OUTM to a power supply in response to a bias voltage VBIAS.

The charge supply block 350 may supply a desired and/or predetermined amount of charges to the APS output terminals APS_OUT1 through APS_OUTM in response to a representative reset signal RG, which may be enabled whenever the N pixel reset signals RG1 through RGN are enabled, and a pre-reset signal PU_RES, which may be enabled for a period of time when the N pixel select signals SEL1 through SELN and the representative reset signal RG are enabled. According to an example embodiment, a representative sensed image transfer signal TG enabled whenever the N sensed image transfer signals TG1 through TGN are enabled may also be used.

The charge supply block 350 may include M charge supply cells corresponding to the M pixel arrays. For example, charge supply block 350 shown in FIG. 3 includes a first charge supply cell 351 and a second charge supply cell 352. In FIG. 3, the first charge supply cell 351 is shown as corresponding to a first pixel array including pixels 311, 312 and 313 and the second charge supply cell 352 is shown as corresponding to a second pixel array including pixels 314, 315 and 316. Each of the M charge supply cells 351 and 352 may have the same configuration as each of the pixels.

Each of the first charge supply cell 351 and the second charge cell supply 352 may include a photo-diode PD, a video signal transfer switch PHO_TG, a reset control switch RCG, a power supply PS and a voltage transfer switch PO_TG. The photo-diode PD may have a first terminal connected to a ground GND and a second terminal sensing a received video signal. The video signal transfer switch PHO_TG may transfer the sensed video signal in response to the representative sensed image transfer signal TG. The reset control switch RCG may switch the first power supply voltage VDDA in response to the representative reset signal RG. The power supply PS may provide a reset voltage corresponding to the first power supply voltage VDDA when the reset control switch RCG is activated and may supply a sensed voltage corresponding to the sensed video signal when the reset control switch RCG is deactivated and the video signal transfer switch PHO_TG is activated. The voltage transfer switch PO_TG may output the voltage transferred from the power supply PS to the corresponding APS output terminal in response to the pre-reset signal PU-RES.

According to another example embodiment, the video signal transfer switch PHO_TG may be replaced with a MOS transistor having a first terminal connected to the second terminal of the photo-diode PD; a second terminal connected to the reset control switch RCG and the power supply PS; and a gate receiving the representative sensed image transfer signal TG. The reset control switch RCG may be replaced with a MOS transistor having a first terminal connected to the first power supply voltage VDDA; a second terminal connected to the power supply PS and the second terminal of the video signal transfer switch PHO_TG; and a gate receiving the representative reset signal RG. The power supply PS may be replaced with a MOS transistor having a first terminal connected to the first power supply voltage VDDA; a second terminal connected to the voltage transfer switch PO_TG; and a gate connected to the second terminal of the video signal transfer switch PHO_TG and the second terminal of the reset control switch RCG. The voltage transfer switch PO_TG may be replaced with a MOS transistor having a first terminal connected to the voltage supply PS; a second terminal connected to the corresponding APS output terminal APS_OUT1; and a gate receiving a pixel select signal.

The CIS circuit may also include a control signal generating circuit (not shown) and a sampling circuit (not shown). The control signal generating circuit may generate the representative reset signal RG and the pre-reset signal PU_RES using the N reset signals and the N pixel select signals. The sampling circuit may sample the voltage of a corresponding APS output terminal using at least two sampling signals.

The sampling signals used in the sampling circuit may be enabled while a pixel select signal is enabled. An initial voltage of a corresponding APS terminal may be detected when the sampling signals are first enabled and a video signal voltage determined by a video signal sensed by the photo-diode may be detected when the sampling signals are enabled a second time. The pre-reset signal PU_RES may be disabled when the sampling signals are enabled.

Figure 4:
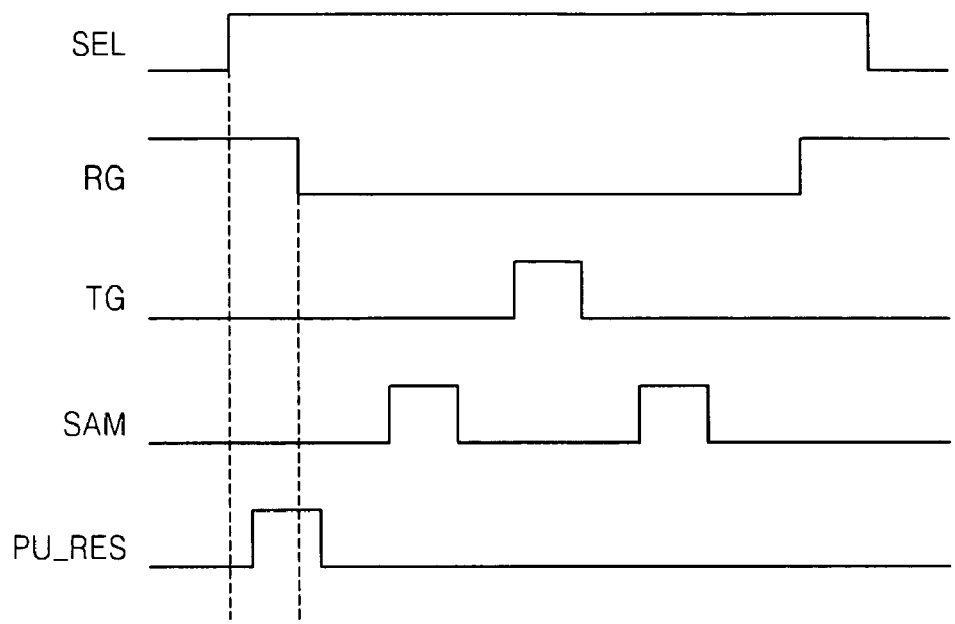
FIG. 4 is an example timing diagram of a CDS operation performed by the CIS circuit of FIG. 3.

FIG. 4 is an example timing diagram of a CDS, which may be performed by the example embodiment of the CIS circuit of FIG. 3. Referring to FIG. 4, the pre-reset signal PU_RES may include a portion of a period in which a pixel select signal SEL is enabled (e.g., is a logic high level) and a portion of a period in which the representative reset signal RG is enabled (e.g., is a logic low level). That is, charges may be supplied to each APS output terminal APS_OUT in response to the pre-reset signal PU_RES just before a sampling signal SAM is first enabled (e.g., transitions to a logic high level).

In a conventional CIS circuit, only charges supplied from pixels are provided to a corresponding APS terminal APS_OUT and thus, a reset time generally increases in consideration of a power supply source (indicated by the dotted-line circle of FIG. 1) of a pixel having a poor driving performance. However, an example embodiment of a CIS circuit may set an initial voltage of a corresponding APS output terminal APS_OUT without increasing a reset time because charges provided through the charge supply cells 351 and 352 may be added to charges supplied from pixels.

Figure 5:
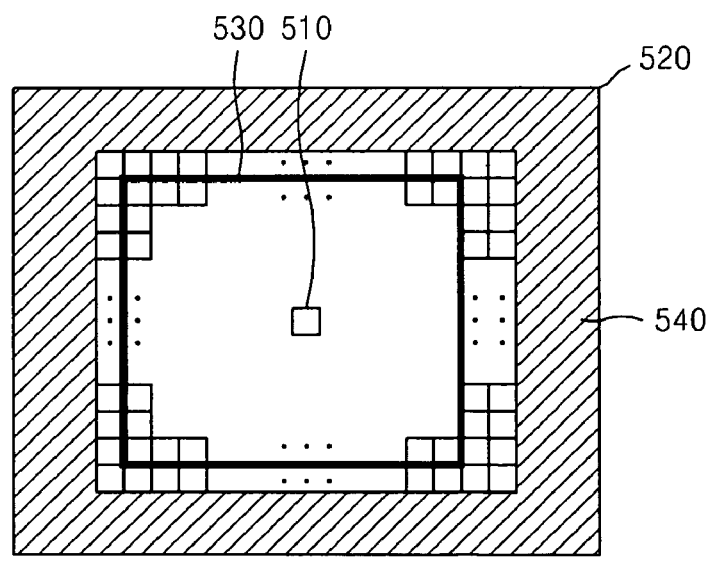
FIG. 5 illustrates an example of a location where an example embodiment of a CIS may be placed.

FIG. 5 illustrates an example placement of an example embodiment of a CIS circuit. Referring to FIG. 5, the APS block 310 and the current source block 330 may be located in an active pixel area 530 opened to receive video signals in the entire APS area 520, and the charge supply block 350 may be located in an optical black area 540 receiving no video signal. A square 510 located in the active pixel area 530 may represent a single pixel.

An example embodiment of a CIS circuit has been explained with reference to FIGS. 3 and 4. A method of operating the CIS circuit may be construed from the above explanation.

As described above, an example embodiment of a CIS circuit and an example embodiment of a method of providing an initial charge of the CIS circuit may perform a high-resolution CDS without increasing a reset time used to set initial values of APS output terminals.

While the example embodiment have been particularly shown and described in the drawings and specification, it will be understood by those of ordinary skill in the art that various changes in form and details may be made therein without departing from the spirit and scope as defined by the following claims.

What is claimed is:

1. A CMOS image sensor (CIS) circuit comprising:
   an active pixel sensor (APS) block including a plurality of pixels and outputting APS signals from a plurality of APS output terminals in response to a plurality of sensed image transfer signals, a plurality of pixel select signals and a plurality of pixel reset signals associated with the plurality of pixels;
   a current source block controlling currents flowing from the plurality of APS output terminals to a power supply in response to a bias voltage; and
   a charge supply block providing a quantity of charges to the plurality of APS output terminals before a sampling signal is enabled in response to a representative reset signal and a pre-reset signal,
   wherein the quantity of charges provided to the plurality of APS terminals is added to charges provided from the APS block to the APS output terminal and decreases an initial charge voltage time.

2. The CIS circuit of claim 1, wherein the representative reset signal is enabled when at least one of the plurality of pixel reset signals is enabled.

3. The CIS circuit of claim 2, wherein the pre-reset signal is enabled for a period of time when at least one of the pixel select signals and the representative reset signal are enabled.

4. The CIS circuit of claim 1, wherein
   the APS block includes M pixel arrays and each of the M pixel arrays has N pixels, M is a number of pixel arrays included in the APS block and N is a number of pixels included in each pixel array.

5. The CIS circuit of claim 4, wherein each of the M pixel arrays include
   a first pixel operating in response to a first sensed image transfer signal, a first pixel select signal and a first pixel reset signal;
   a second pixel operating in response to a second sensed image transfer signal, a second pixel select signal and a second pixel reset signal; and
   an Nth pixel operating in response to an Nth sensed image transfer signal, an Nth pixel select signal and an Nth pixel reset signal.

6. The CIS circuit of claim 1, further comprising:
   a control signal generating circuit generating the representative reset signal and the pre-reset signal using the plurality of reset signals and the plurality of pixel select signals.

7. The CIS circuit of claim 1, further comprising:
   a sampling circuit sampling the voltage of an APS output terminal associated with a pixel selected by an enabled pixel select signal using a sampling signal that is enabled at least twice, wherein
   the sampling circuit detects an initial voltage of the APS output terminal when the sampling signal is first enabled, and detects a video signal voltage determined by a video signal sensed by a photo-diode when the sampling signal is enabled again.

8. The CIS circuit of claim 7, wherein the pre-reset signal is disabled while the sampling signal is enabled.

9. The CIS circuit of claim 1, wherein the APS block and the current source block are located in an active pixel area, and the charge supply block is located in an optical black area.

10. The CIS circuit of claim 1, wherein the charge supply block includes a plurality of charge supply cells each having the same configuration as each of the plurality of pixels.

11. The CIS circuit of claim 10, wherein each of the charge supply cells comprises:
    a photo-diode having a first terminal connected to a ground and a second terminal sensing a received video signal;
    a video signal transfer switch transferring the sensed video signal in response to a representative sensed image transfer signal;
    a reset control switch switching a first power supply voltage in response to the representative reset signal;
    a power supply providing a reset voltage corresponding to the first power supply voltage if the reset control switch is activated and providing a sensed voltage corresponding to the sensed video signal if the reset control switch is deactivated and the video signal transfer switch is activated; and
    a voltage transfer switch outputting the voltage provided by the power supply to an APS output terminal in response to a pixel select signal.

12. The CIS circuit of claim 11, wherein
    the video signal transfer switch includes a first MOS transistor having a first terminal connected to the second terminal of the photo-diode, a second terminal connected to the reset control switch and the power supply, and a gate receiving the representative sensed image transfer signal,
    the reset control switch includes a second MOS transistor having a first terminal connected to the source of the first power supply voltage, a second terminal connected to the power supply and the second terminal of the video signal transfer switch, and a gate receiving the representative reset signal,
    the power supply includes a third MOS transistor having a first terminal connected to a source of the first power supply voltage, a second terminal connected to the voltage transfer switch, and a gate connected to the second terminal of the video signal transfer switch and the second terminal of the reset control switch, and
    the voltage transfer switch includes a fourth MOS transistor having a first terminal connected to the second terminal of the power supply, a second terminal connected to the APS output terminal, and a gate receiving the pre-reset signal.

13. A method of providing initial charges to at least one APS output terminal of a CIS circuit, comprising:
    receiving a representative reset signal and a pre-reset signal;
    providing the initial charges to the at least one APS output terminal before a sampling signal is enabled in response to the representative reset signal and the pre-reset signal; and
    adding the initial charges to charges provided to the at least one APS output terminal from at least one pixel of the CIS circuit before the sampling signal is enabled.

14. The method of claim 13, further comprising:
    enabling a sampling signal at least twice to sample the at least one APS output terminal;
    detecting an initial voltage of the at least one when the sampling signal is first enabled; and detecting a video signal voltage sensed by a photodiode when the sampling signal is enabled again.

15. The method of claim 14, wherein the sampling signal is enabled if a pixel select signal is enabled.

16. The method of claim 14, wherein the pre-reset signal is disabled while the sampling signal is enabled.

* * * * *